… …

UNITED STATES PATENT OFFICE 2,117,901

THERAPEUTICALLY ACTIVE ORGANIC MERCURIAL DERIVATIVES OF CAMPHORAMIC ACID AND ITS SALT AND THE PROCESS OF PREPARING THE SAME

Nicholas M. Molnar, New York, N. Y.

No Drawing. Application April 26, 1937,
Serial No. 139,006

15 Claims. (Cl. 260—13).

This invention relates to organic mercurial derivatives of camphoramic acid in water soluble form, and a simple and new process for preparing them, more particularly to compounds of the following formula:

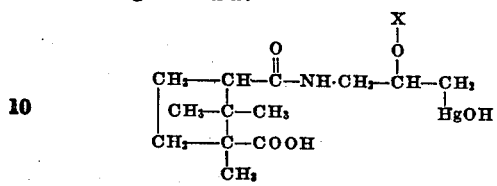

where X is a methyl, ethyl or propyl or isopropyl radical; or

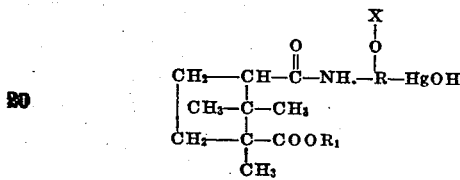

where R is either a propyl, butyl, amyl or any straight chain aliphatic residue and $x$ is as stated above and $R_1$ is either hydrogen, or a metal, belonging to the alkali or alkaline earth group or any other metal of an atomic weight below 56.

I have found that by processes described below, I produced compounds which are therapeutically active, being good diuretics, particularly, when mixed with an acidic group such as theophylline or theobromine, to neutralize the alkalinity of the sodium salt.

I produced these compounds by dissolving mercuric acetate or mercuric chloride in either methyl, ethyl, propyl or isopropyl alcohol and react this solution with a camphoramic acid having an unsaturated side chain, such compounds being described by W. O. Wootton (J. Chem. Soc. 97 405–15 (1910)).

The following example illustrates the invention, but it is not intended to limit it thereto.

31.9 grams of mercuric acetate are dissolved in 400 c. c. methyl alcohol and treated with 23.9 grams of allyl camphoramic acid dissolved in 75 c. c. of methyl alcohol. A precipitate forms, but it clears up on standing overnight.

Next day the solution is evaporated in a vacuum to measure about 100 c. c. and dropped under rapid stirring, into 500 c. c. of water. An amorphous precipitate forms. The stirring is continued till this precipitate hardens. This is then filtered off and washed with water and dried in a vacuum oven at 40° C. The analysis shows a mercury content of 41.2% and a nitrogen content of 2.87%.

The reaction follows as indicated by equations below.

The reaction between mercuric acetate and methyl alcohol and allyl camphoramic acid is believed to be as follows:

(1)   $(CH_3COO)_2Hg + CH_3OH \rightarrow CH_3COOHgOCH_3$
           (a)              (b)              (c)

(2) 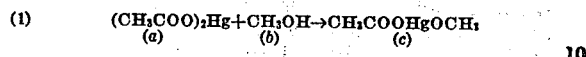
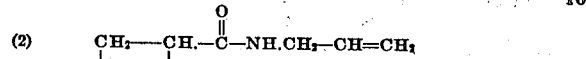

(d)

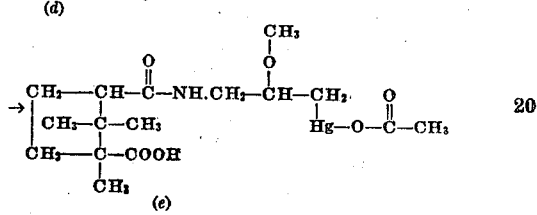

(e)

In water this compound (e) hydrolyzes as follows:

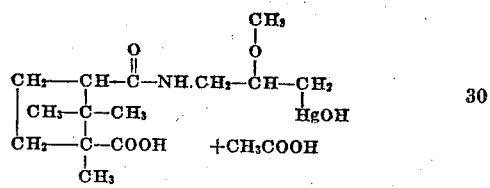

To form the final useful product, adapted as an active therapeutic substance, the precipitate is treated in equivalent proportions with the hydroxide of an alkaline metal, or of a metal with an atomic weight below 56, which renders the compound water-soluble, so that it can be administered by injection and readily absorbed.

I claim:

1. The process of preparing a mercurial derivative of an alicyclic dicarboxylic acid having in an aliphatic side chain, an amino group containing an alkoxyl group and mercury with one atom linked to a carbon atom, the other to a hydroxy group, which comprises dissolving a soluble mercuric salt in a saturated monohydroxy alcohol of not more than three carbon atoms, treating the solution with camphoramic acid having alkylene side chain containing not more than five carbon atoms one of said carbon atoms being attached to nitrogen, thereafter evaporating the solution in a vacuum, and subsequently hydrolyzing with water under agitation the concentrated solution to form an amorphous precipitate, the product having the formula:

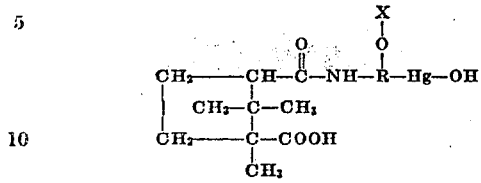

where X represents an alkoxy radical containing not more than three carbon atoms and R represents the unsaturated side chain.

2. The process of producing water soluble, mercurial derivative of a camphoramic acid of the formula set forth in claim 1, by treating it with an equivalent proportion of hydroxide of a metal with an atomic weight below 56.

3. The process which comprises treating a N-alkylene derivative of a camphoramic acid with a mercuric salt in a saturated monohydroxy alcohol of not more than three carbon atoms, evaporating, and subsequently hydrolyzing the same.

4. The process which comprises reacting allyl camphoramic acid with a mercuric salt in a saturated monohydroxy alcohol solution containing not more than three carbon atoms, evaporating and subsequently hydrolyzing the same.

5. The process which comprises reacting a methyl alcohol solution of mercuric acetate with a methyl alcohol solution of allyl camphoramic acid, evaporating the same down, and adding it to water with stirring to effect hydrolysis thereof.

6. The process which comprises reacting a solution of 31.9 grams of mercuric acetate in 400 c. c. methyl alcohol with a solution of 23.9 grams of allyl camphoramic acid in 75 c. c. of methyl alcohol, evaporating the same down in a vacuum, and adding it to about 500 c. c. of water under rapid stirring to effect hydrolysis thereof.

7. The process which comprises reacting N(n-butenyl) camphoramic acid with a mercuric salt in a saturated monohydroxy alcohol solution containing not more than three carbon atoms, and subsequently hydrolyzing.

8. The process which comprises reacting N(n-butenyl) camphoramic acid with mercuric acetate in a saturated monohydroxy alcohol solution, containing not more than three carbon atoms, evaporating the same, and subsequently hydrolyzing.

9. The process which comprises reacting N(n-amylene camphoramic acid with a mercuric salt in a saturated monohydroxy alcohol solution containing not more than three carbon atoms, and subsequently hydrolyzing.

10. The process which comprises reacting N(n-amylene) camphoramic acid with mercuric acetate in a saturated monohydroxy alcohol containing not more than three carbon atoms, evaporating the same down, and subsequently hydrolyzing.

11. The process for preparing a mercuric derivative of camphoramic acid which comprises treating camphoramic acid having an N(n-alkylene) side chain, containing not more than five carbon atoms, the carbon of said side chain being attached to the N of amino group, with mercuric chloride in a solution of a saturated monohydroxy alcohol containing not more than three carbon atoms, evaporating the same down and subsequently hydrolyzing.

12. The process for preparing a mercuric derivative of a camphoramic acid which comprises treating a lower N-alkylene derivative of camphoramic acid in a solution of a saturated monohydroxy alcohol, containing not more than three carbon atoms with a mercuric salt dissolved in water.

13. The compounds of the following formula:

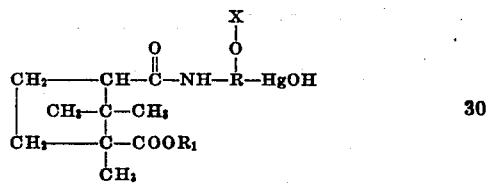

where R is one of a group consisting of propyl, butyl and amyl, where X is one of a group consisting of ethyl, propyl and isopropyl, where $R_1$ is a cation of an element with an atomic weight below 56.

14. The compounds according to formula in claim 13 in which $R_1$ is hydrogen which compounds are white powders.

15. The compounds of the following formula:

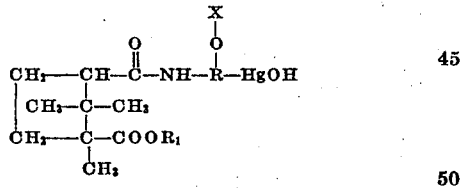

where $R_1$ is a metal having an atomic weight below 56, which compounds are crystalline solids, and X is one of a group consisting of ethyl, propyl and isopropyl, and R is a lower saturated alkyl radical.

NICHOLAS M. MOLNAR.